(12) United States Patent
Liao (10) Patent No.: US 6,257,382 B1
(45) Date of Patent: Jul. 10, 2001

(54) CABLE WINDING APPARATUS

(76) Inventor: Sheng-Hsin Liao, No. 10, Alley 38, Lane 229, San Chun St., Shu Lin Jen, Taipei Hsien (TW)

( * ) Notice: Subject to any disclaimer, the term of this patent is extended or adjusted under 35 U.S.C. 154(b) by 0 days.

(21) Appl. No.: 09/377,422

(22) Filed: Aug. 20, 1999

(51) Int. Cl.[7] .................................................. H02G 11/00
(52) U.S. Cl. ........................................................ 191/12.2 R
(58) Field of Search ............................ 191/12 R, 12.2 R, 191/12.4

(56) References Cited

U.S. PATENT DOCUMENTS

| | | | |
|---|---|---|---|
| 5,180,040 | * | 1/1993 | Ji ..................................... 191/12.2 R |
| 5,453,585 | * | 9/1995 | Lenz et al. ...................... 191/12.2 R |
| 5,701,981 | * | 12/1997 | Marshall et al. ................... 191/12.4 |
| 6,059,081 | * | 5/2000 | Patterson et al. ............... 191/12.2 R |

\* cited by examiner

*Primary Examiner*—S. Joseph Morano
*Assistant Examiner*—Robert J. McCarry, Jr.
(74) *Attorney, Agent, or Firm*—Rosenberg, Klein & Lee (57) ABSTRACT

An alternatively positioned and wound wire winding box comprises a housing, a first communication cable, a first conductive disk, a first communication cable, a spiral spring, a second communication cable, and a second conductive disk. A swing piece and a ratchet which are adjacent to and overlapped with one another are installed at one side of the one housing. A plurality of grooves are installed around the periphery of the first conductive disk. Each of two sides of the pivotal position of the swinging piece is extended with an integrally formed elastic piece which may resist against the wall of the housing. Another end of the swinging piece with respect to the pivotal position is formed with a tongue which may obliquely resist against the periphery of the disk and at proper condition it can enter into the groove. A plurality of ratchet teeth are installed at the ratchet. Every other ratchet tooth, the side of the tooth adjacent to the swing piece being installed with a buckling block. At two sides of the bottom of the swing piece adjacent to the ratchet, each side is installed with a catch. As the swing piece swings, the ratchet teeth are pushed to engage with the gap between two teeth. One of the catches is installed with an engaging block at the lateral side thereof for engaging a respective buckling block. Thus, positioning and rewinding actions of the alternatively positioned and wound wire winding box by regularly pulling and releasing the communication cable will make the user clearly understand the relation of the positioning the rewinding of the cable, and thus may control the wire winding box easily and conveniently.

17 Claims, 8 Drawing Sheets

CABLE WINDING APPARATUS

FIELD OF THE INVENTION

The present invention relates to a wire winding box, and especially to an alternatively positioned and wound wire winding box for increasing the communicating distance of a wired communication, moreover, the communication cable may be rewound easily and conveniently. By the intermittent pulling and releasing the cable, the cable may be positioned and winding by staged.

BACKGROUND OF THE INVENTION

Various kinds of wire winding boxes are developed for avoiding the improper winding of cables between communication devices, or a wired communication primary machine (for example, the main frame of a telephone) and a communication secondary machine (for example, the receiver of a telephone). The structure of the wire winding box includes a housing, two conductive disks, at least one spiral spring, and two communication cables. One of the conductive disks is installed with a plurality of concentric conductive rings with unequal diameters and connected to each conductive wire of a communication cable. Another conductive disk is installed with a plurality of conductive pieces or metal rolling balls which are connected to the conductive wires of another communication cable. One rotary conductive disk is installed with a spiral spring and is wound by communication cable. Therefore, as two conductive disks are rotates respectively, an electric connection is retained. Thus, the communication cable can be pulled out or rewound. Such kinds of structures have been produced and sold in commercia market.

However, in the prior art wire winding box, the conductive disk can rotate freely and the communication cable is pulled by the elastic force from a spiral spring. Thus, although the communication cable can be pulled successfully, it can not be positioned. Besides, in the conventional wire winding box, as a communication cable is pulled out, it will present a tightening state due to the effect of elasticity so as to rewind the cable and thus the receiver will be pulled back. This is a great trouble to the user.

Therefore, some wire winding boxes have been invented for positioning the communication cable as it is pulled out. In those structure, a swing-able buckling piece is installed at one side within the housing, while the periphery of a rotatable conductive disk is installed with a larger cambered notch and at least one smaller inclined groove. In normal condition, the communication cable can be pulled out freely so as to rotate the conductive disk successfully. While as the communication cable is released so as to wind the communication cable, only the buckling piece is buckled at any inclined groove, then the conductive disk can be caught and positioned. However, if the buckling piece is dropped into a cambered notch, the conductive disk will not be caught again and thus the communication cable can be rewound freely. Thus, the defects in the conventional wire winding box can be overcome effectively and rapidly. But in these wire winding boxes, the position and length of a pulled communication cable can not be precisely controlled and predicted, therefore. often a reversing reaction is generated as a users operates the communication cable. This is a disadvantage in the prior art.

SUMMARY OF THE INVENTION

Accordingly, the primary object of the present invention is to provide an alternatively positioned and wound wire winding box comprises a housing, a first communication cable, a first conductive disk, a first communication cable, a spiral spring, a second communication cable, a second conductive disk. A swing piece and a ratchet which are adjacent to and overlapped with one another are installed at one side of the one housing. A plurality of grooves are installed around the periphery of the first conductive disk. Each of two sides of the pivotal position of the swinging piece is extended with an integrally formed elastic piece which may resist against the wall of the housing. Another end of the swinging piece with respect to the pivotal position is formed with a tongue which may obliquely resist against the periphery of the disk and at proper condition it can enter into the groove. A plurality of ratchet teeth are installed at the ratchet every other ratchet tooth. The side of the tooth adjacent to the swing piece being installed with a buckling block. At two sides of the bottom of the swing piece adjacent to the ratchet, each is installed with a catch. As the swing piece swings, the ratchet teeth are pushed to engage with a gap between teeth. One of the catches is installed with an engaging block at the lateral side thereof for engaging a respective buckling block. Thus, positioning and rewinding actions of The alternative positioned and wound wire winding box by regularly pulling and releasing the communication cable will make the user clearly understand the relation of the positioning the rewinding of the cable, and thus may control the wire winding box easily and conveniently.

The various objects and advantages of the present invention will be more readily understood from the following detailed description when read in conjunction with the appended drawing.

DETAILED DESCRIPTION OF THE PREFERRED EMBODIMENTS

With reference to FIGS. 1~5, the improved structure of a wire winding box includes a housing 1, a first communication cable 2, a first conductive disk 3, a spiral spring 4, a second communication cable 5 and a second communication cable 6.

The housing 1 is formed by a first housing 10 and a second housing 11. In the proper position of the first housing 10 is installed with a line hole 100 for being protruded by the outer end of the plug 20 of the first communication cable 2. A round ring 101 is formed on the center of the inner lateral surface of the housing. While a pad 12 is installed at the lateral side. Two stoppers 120 with a shape as Chinese word "几" are formed at the front edges of the two sides of the stopper 120. Thus, the pad 12 and the wall of the housing are formed with a space for receiving a spiral spring 4. The second housing 14 is also installed with a line hole 221 for being inserted by the second communication cable 5.

Figure 1:
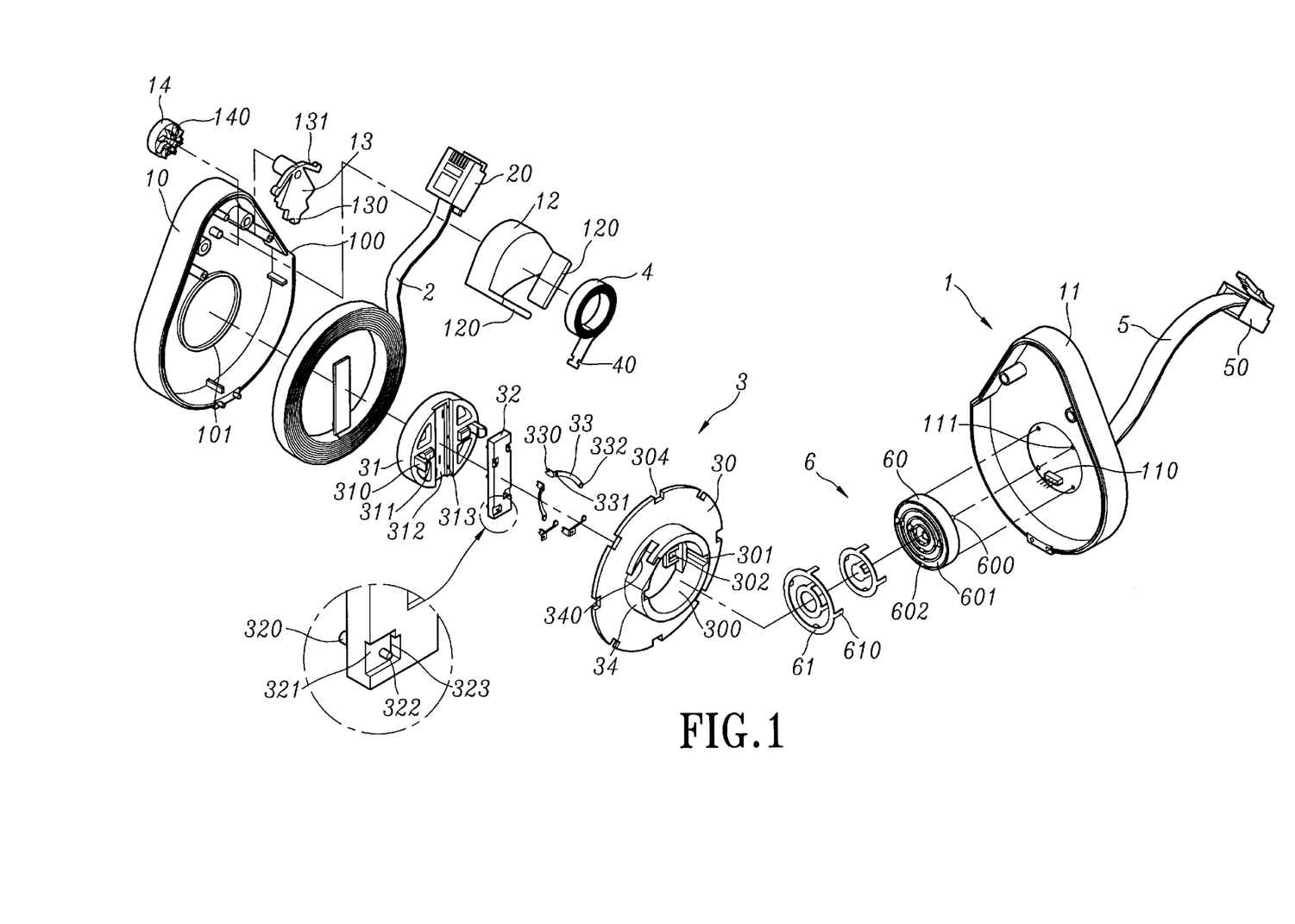
FIG. 1 is an exploded perspective view of the present invention.
Figure 2:
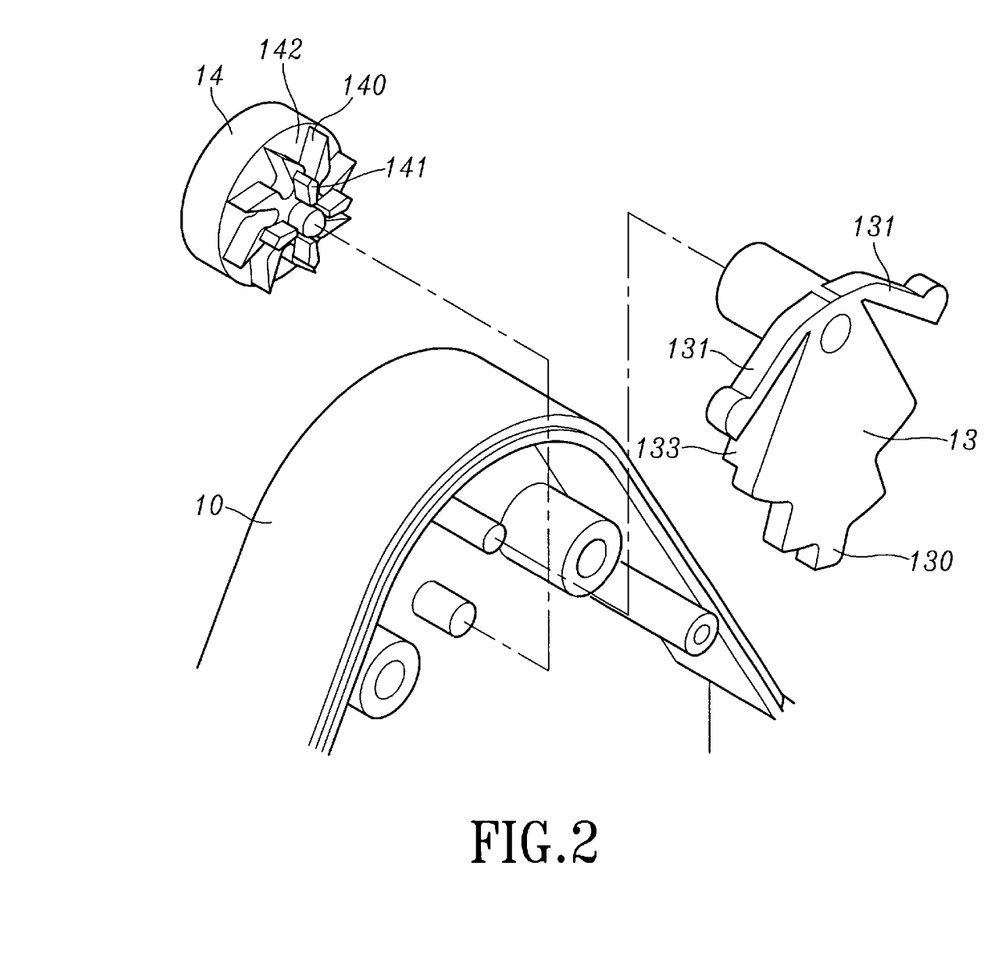
FIG. 2 is a partial enlarged perspective view showing the respective relation of the swing piece, ratchet and first housing.

In the first conductive disk 3, two buckling holes 301 and two positioning holes 302 are formed at two sides of one line (diameter line) passing through the center through hole 300 of the disk 30 (as shown in FIG. 2), and two hooks 310 and the two positioning blocks 3111 are at two sides of a diameter line on a supporting seat 31, the diameter line on the supporting seat 31 is correspondent the diameter line in disk 30. The hooks and the positioning block is engaged to the bottom of the disk 30 for being wound by the first communication cable 2. Then, the supporting seat 31 is engaged with the round ring 101 of the first housing 10 and thus is rotatable.

A radial wire groove 312 is installed at the inner side of the supporting seat 31 for being inserted by the inner end of the first communication cable 2. Two sides of the wire groove 312 are formed with inserting holes 313. A further positioning block 32 is installed for matching with the wire groove 312. The bottom of the positioning block 32 is installed with a plurality of inserting post 320 for being inserted into the inserting holes 313 so as to combine the supporting seat 31. A plurality of alternatively arranged positioning grooves 321 are formed at two sides of the positioning block. Each positioning groove 321 is installed with a positioning post 322 and a through hole 323 for fixing a cambered elastic conductive piece 33.

Each inner end of the conductive piece 33 is formed with a fork 330 and has a positioning hole 331 for being inserted into the through hole 323 and being inserted by the respective conductive wire of the first communication cable 2, respectively, so as to be fixed to the positioning groove 321. Thus, the outer end of the conductive piece 33 can be inserted into the through hole 300 so as to be extended to several places in different radius. The outer end of each conductive piece 33 is formed with a convex portion 332, or a concave portion is formed for receiving a metal rolling ball, accordingly, so as to be continuously contacted with the second conductive disk 6.

Besides, the front side of the disk 30 of the first conductive disk 3 different from the side facing to the supporting seat is formed with a convex ring 34 one side of which is installed with a buckling groove 340 so that the buckling end of the aforementioned spiral spring 40 can be buckled therein and can be wound on the convex ring 34 at a proper time.

The second conductive disk 6 is movably received within the convex ring 34 of the first conductive disk 3 and a plurality of convex post 600 are installed for being inserted into the respective concave holes 111 of the second housing 11. One side of the disk 60 of the second conductive disk has a plurality of concentric trenches 601 with unequal diameters. Each trench 601 has a respect positioning hole 602 so that the metal conductive rings with different diameters and each having positioning piece 601 are embedded into a respective trench 601, thus the positioning piece 610 is inserted into the positioning hole 602 for being fixed therewithin and is inserted into the respective conductive wire in the second communication cable 5. Each conductive ring 61 is retained to continuously contact with the conductive piece 33 even in rotation. Therefore, a wire winding box with the function of winding wires are formed.

Figure 3:
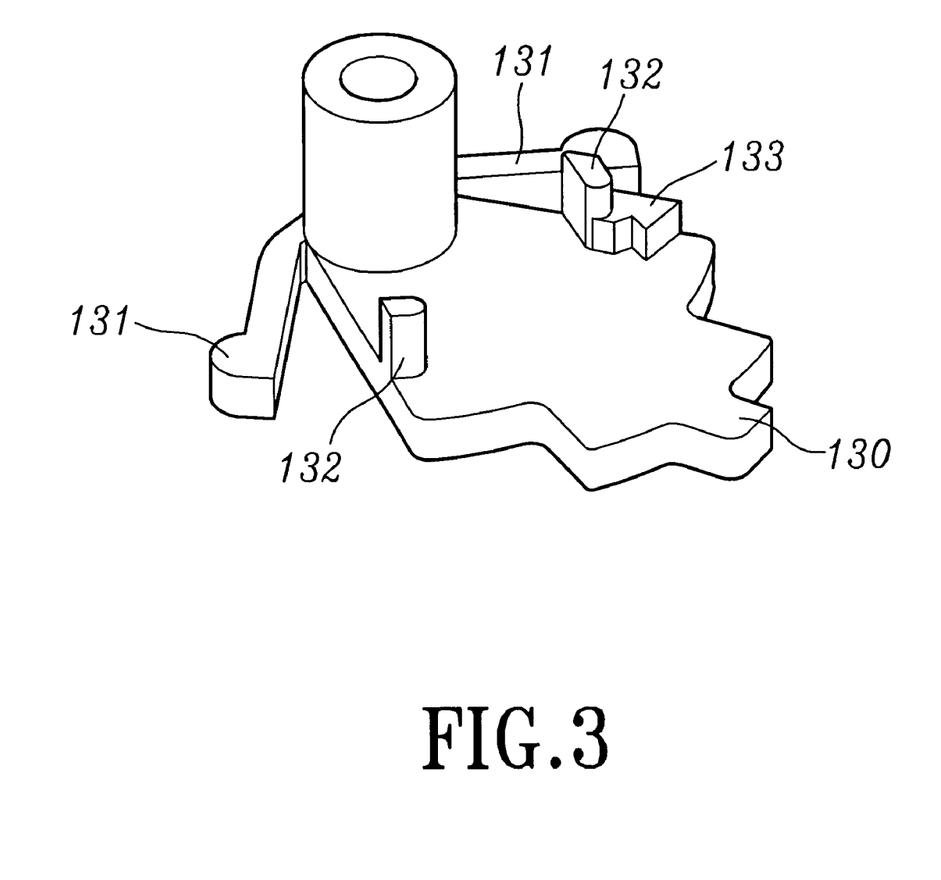
FIG. 3 is a perspective view showing the lateral structure of the swing piece in the present invention.
Figure 4:
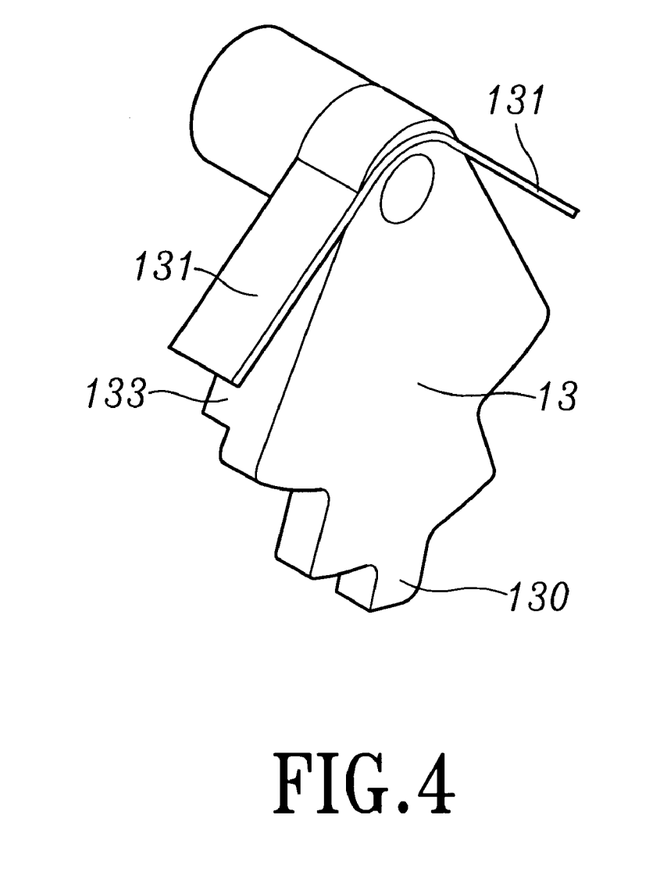
FIG. 4 is a perspective view showing the structure of another embodiment in the present invention.
Figure 5:
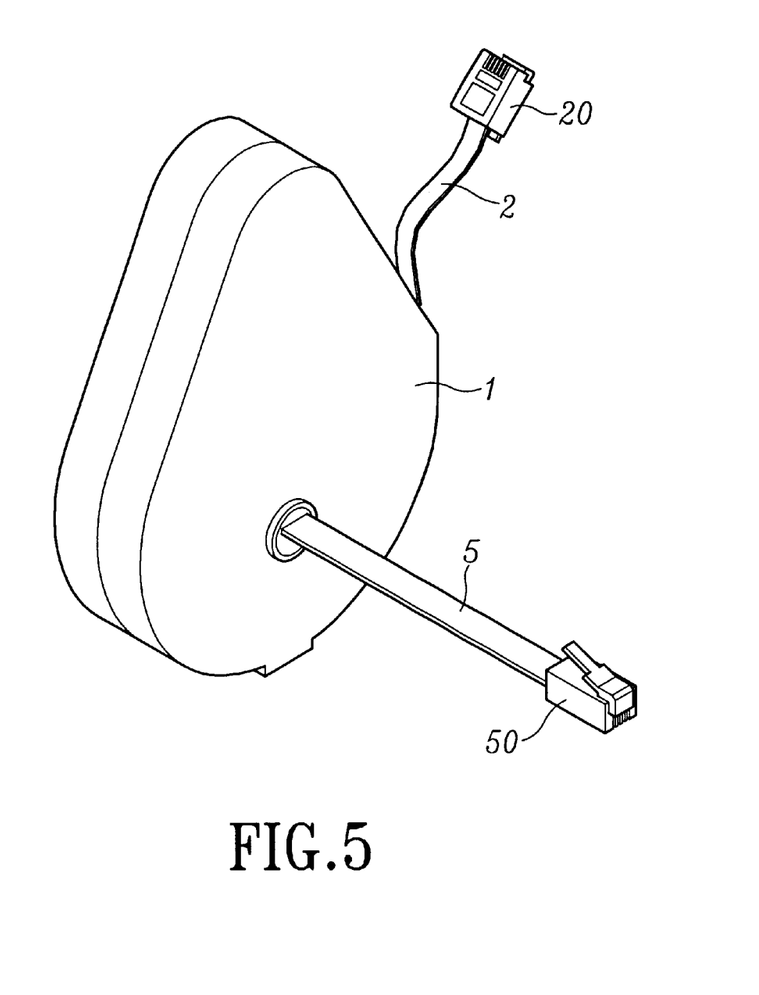
FIG. 5 is a perspective view showing the outlook of the present invention.

Especially, as shown in FIGS. 2 and 3, at the bottom of the pad 12 of the first housing 10 are pivotally installed with swinging piece 13 and a freely rotated ratchet 14 which are located adjacent to one another. A part of the swing piece 13 and a part of the ratchet 14 are overlapped. By a plurality of grooves 304 being installed at the periphery of the disk 30 of the first conductive disk 3, each of two sides of the pivotal position of the swinging piece 13 is extended with an integrally formed elastic piece 131 which may resist against the wall of the housing, or as shown in FIG. 4, a metal elastic piece 131 is further assembled. Another end of the swinging piece 13 with respect to the pivotal position is formed with a tongue 130 which may obliguely resist against the periphery of the disk 30 and at proper condition it may enter into the groove 304. A plurality of ratchet teeth 140 are installed at the ratchet 14. Every other one ratchet tooth 140, the side of the tooth 140 adjacent to the swing piece 13 is installed with a buckling block 141. With reference to FIG. 3, two sides of the bottom of the swing piece 13 adjacent to the ratchet 14 each installed with a catch 132, as the swing piece 13 swings, the ratchet teeth 140 can be pushed to be engaged with the gap 142. One of the catches is installed with an engaging block 133 at the lateral side thereof for engaging a respective buckling block 141 at certain condition.

Figure 6:
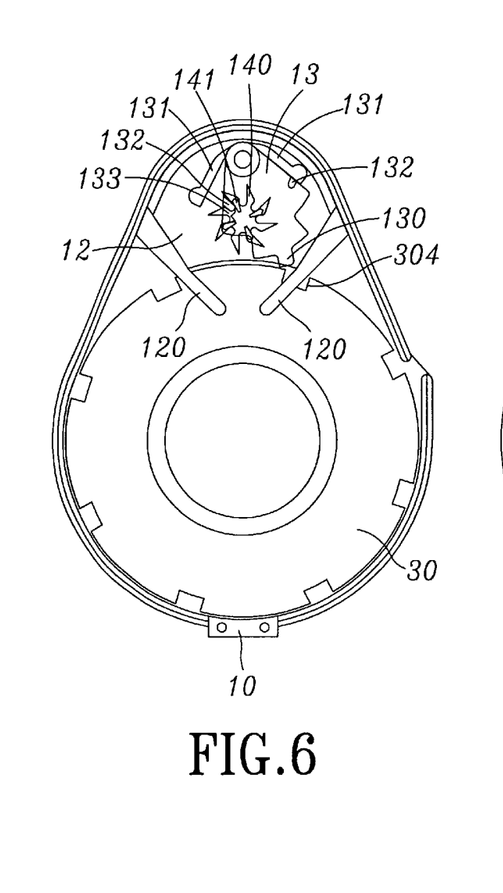
FIG. 6 is plane schematic view showing the relation of the swing piece and the ratchet of the present invention in the initial condition.
Figure 7:
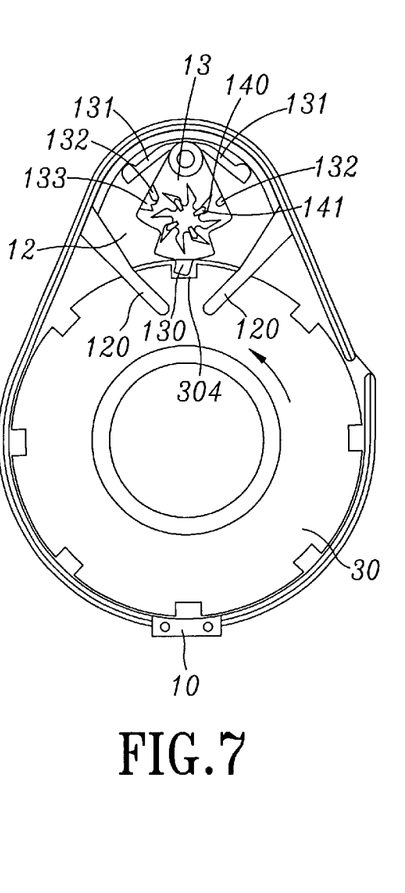
FIG. 7 is a plane schematic view showing the relation of the swing piece and the rachet of the present invention as the communication cable is pulled out.
Figure 8:
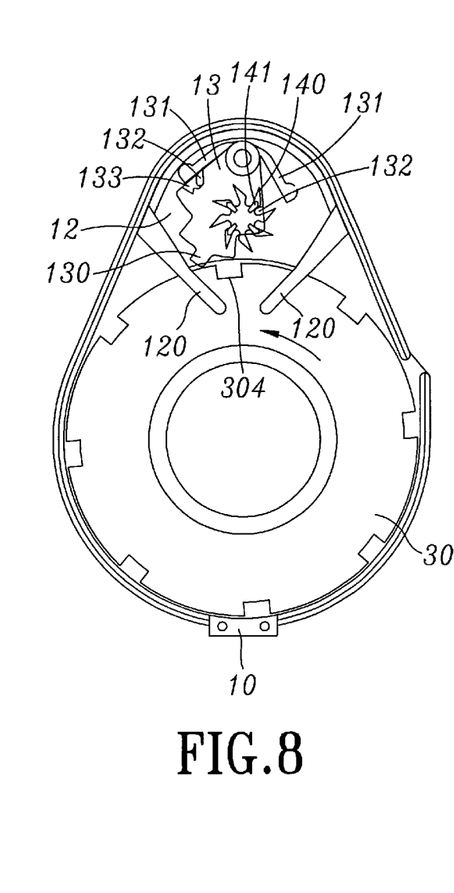
FIG. 8 is a plane schematic view showing the relation of the swing piece and the ratchet of the present invention as the communication cable is further pulled out.
Figure 9:
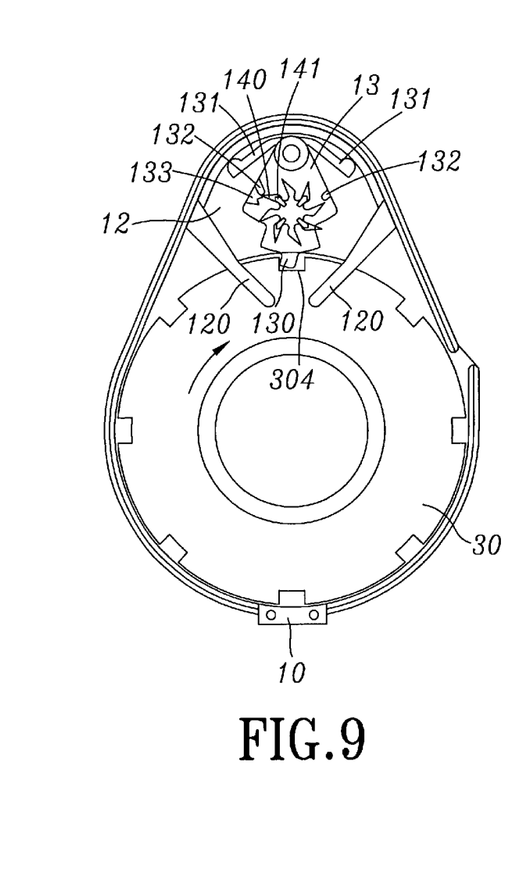
FIG. 9 is a plane schematic view showing the relation of the swing piece and the ratchet of the present invention as the communication cable is released and rewound.
Figure 10:
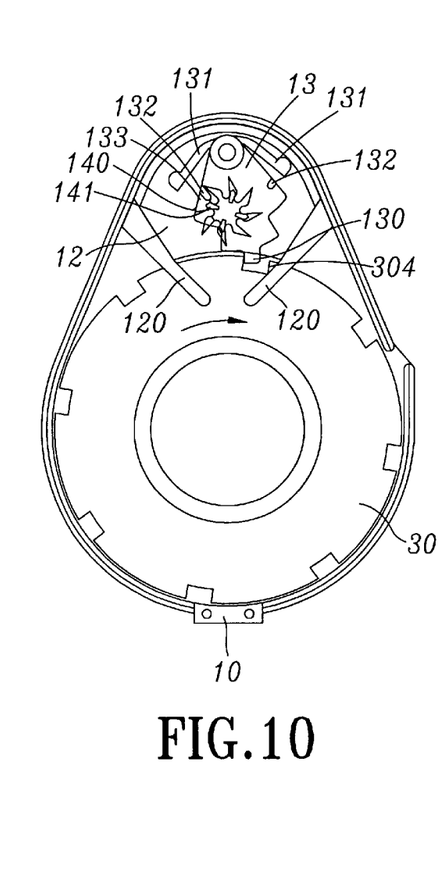
FIG. 10 is a plane schematic view showing the relation of the swing piece and the ratchet of the present invention as the communication cable is caught so to be positioned.
Figure 11:
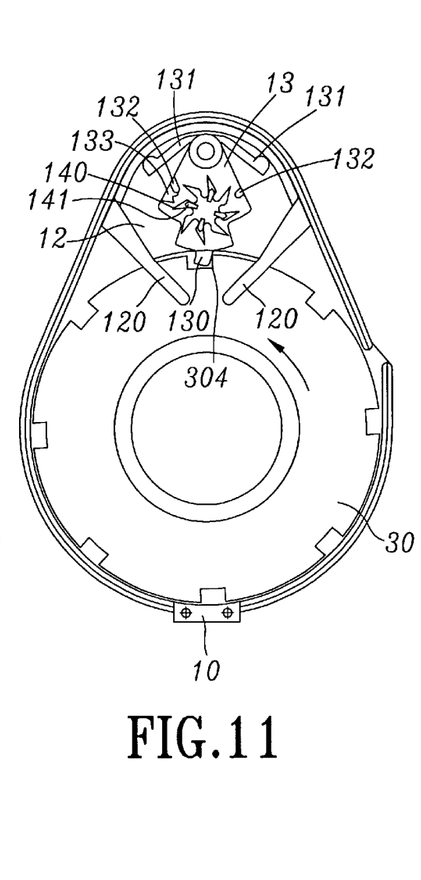
FIG. 11 is a plane schematic view showing the relation of the swing piece and the ratchet of the present invention as the communication cable is pulled out second times.
Figure 12:
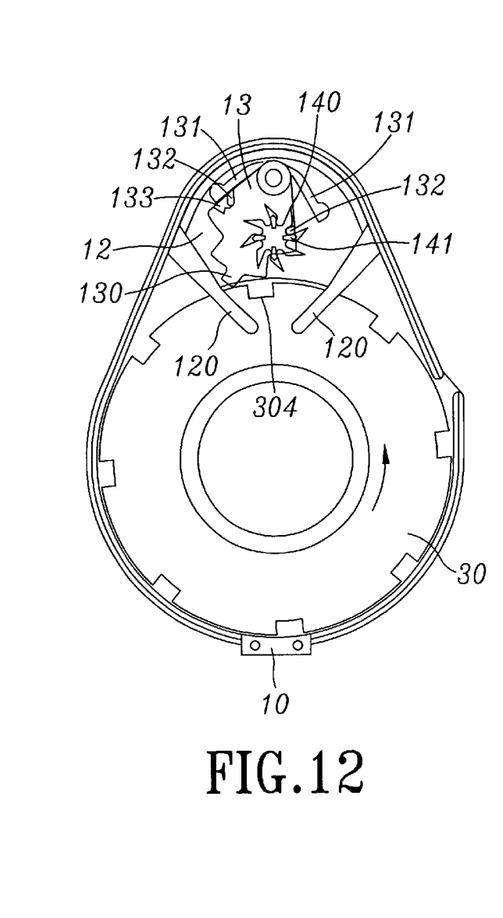
FIG. 12 is a plane schematic view showing the relation of the swing piece and the ratchet of the present invention as the communication cable is further pulled out at second times.
Figure 13:
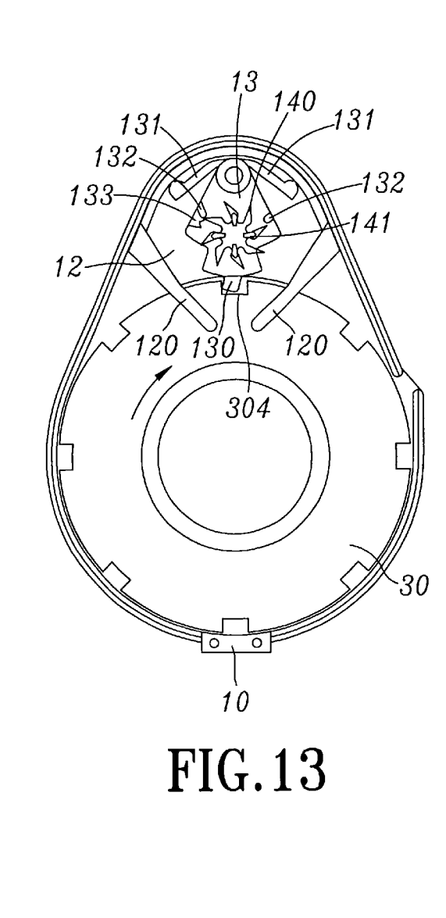
FIG. 13 is a plane schematic view showing the relation of the swing piece and the ratchet of the present invention as the communication cable is released again.
Figure 14:
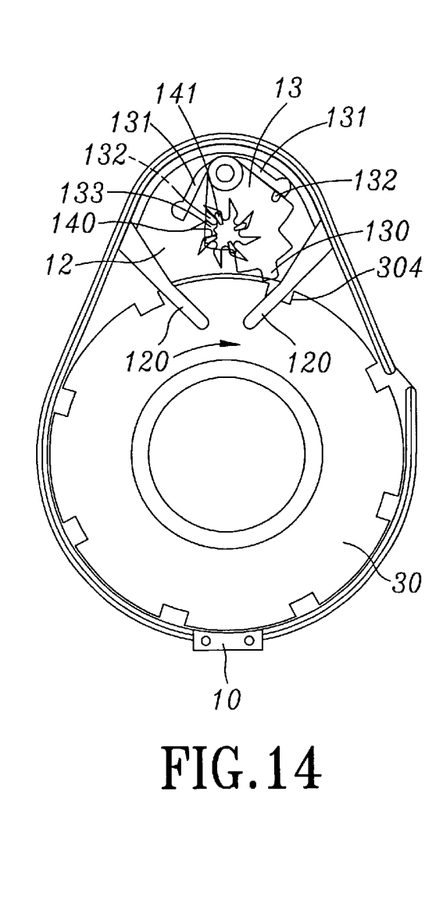
FIG. 14 is a plane schematic view showing the relation of the swing piece and the ratchet of the present invention as the communication cable can be wound continuously.

Therefore, as shown in FIG. 6, in the initial condition, the swinging piece 13 swings leftwards and only left catch 13 is engaged into the left ratchet teeth 140 of the ratchet 14. When the communication cable 2 is pulled so that the disk 30 is rotated to a proper position counterclockwise. The right elastic arm 131 will force the tongue 130 to enter into the groove 304 by a resilient force. Therefore, the tongue will move so as to drive the swing piece 13 to swing leftwards, as shown in FIGS. 7 and 8. Then, the left catch 132 will push the right ratchet teeth 140 to move through half interval of the gap between two teeth and then is engaged as so to be fixed therein. In this condition, the disk 30 may freely rotate continuously and counterclockwise. While as the communication cable is released and is rewound as shown in FIGS. 9 and 10, similarly, the swing piece 13 will resilient by the elastic force of the left elastic arm 131 to drive the tongue 130 to enter into the groove 304 and then is pushed leftwards by the disk 30 rotating clockwise. Not only the left catch 132 will push the ratchet teeth to move through half interval, but also the engaging block 133 will buckle the buckling block 141 of the ratchet 14 so as to be caught so that the buckling block 141 can not swing rightwards. Thus, now the disk 30 is buckled so not to further rewind the communication cable 2. Thus, the effect of positioning is achieved. Thereafter, if the communication cable is pulled out further, as that shown in FIGS. 11 to 12, the swing piece 13 is pushed leftwards again since the right elastic arm 131 and the tongue 130 are buckled to the groove 304 of the disk 30 which rotates counterclockwise so that the relation between the ratchet 14 and the swinging piece 13 are identical to that shown in FIG. 8. Namely, the disk 30 may rotate freely counterclockwise so that the communication cable 2 can be pulled continuously. However, despite the length of the cable being pulled out, once the cable is released, as shown in FIGS. 13 and 14, the swing piece 13 will swing rightwards to the initial condition by the elastic force of the left elastic arm 131 as that shown in FIG. 6 but is different from the state shown n FIG. 10. That is, only the left catch 132 is pushed and is engaged into the left ratchet teeth 140, while the engaging block 133 does not buckle the buckling block 141. Thus, the disk 30 can freely rotate clockwise, therefore, the communication cable is rewound freely.

In summary, by the swinging piece 13 to swing leftwards and rightwards one time so that the ratchet 14 rotates through one unit of tooth 142 and by the special design that two ratchet teeth 140 sharing a buckling block 141, despite the pulling length of the cable, when after a user pulls the communication cable 2 at first time and then release the cable 2 firstly, if the cable can be positioned, then after the cable 2 is pulled again, it must be rewind as it is released again, and vice versa. This positioning and rewinding actions by regularly pulling and releasing the communication cable will make the user clearly understand the relation of the positioning the rewinding of the cable, and thus may control the wire winding box easily and conveniently.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A cable winding apparatus comprising:
    (a) a housing having first and second housing members joined one to the other, each of said first housing member having a line hole opening formed therethrough;
    (b) a first conductive disk rotatably disposed within said housing, said first conductive disk having a plurality of grooved portions formed thereon, and including a plurality of conductive pieces extending therefrom;
    (c) a first communication cable disposed on said first conductive disk passing through said line hole opening of said first housing member, said first communication cable being electrically coupled to said conductive pieces;
    (d) a spiral spring coupled to said first conductive disk for angularly biasing said first conductive disk relative to said first housing member;
    (e) a second conductive disk coupled to said second housing member, said second conductive disk having formed thereon a plurality of conductive rings respectively contacting said conductive pieces of said first conductive disk;
    (f) a second communication cable electrically coupled to said second conductive disk, said second communication cable passing through said line hole opening of said second housing member;
    (g) a ratchet rotatably coupled to one of said first and second housing members, said ratchet having formed thereon a plurality of ratchet teeth and a plurality of axially extending buckling blocks angularly spaced one from the other; and,
    (h) a swing piece coupled to one of said first and second housing members in pivotally displaceable manner, said swing piece being displaceable about a pivot axis through a displacement range extending between first and second positions responsive to the rotation of said first conductive disk, said swing piece including a pair of elastic pieces projecting from a main portion for respectively biasing said swing piece away from said first and second positions, said swing piece having formed on said main portion thereof:
        (1) a radially extended tongue for engaging said groove portions of said first conductive disk;
        (2) first and second axially extended catches for engaging said ratchet teeth during at least a portion of said displacement range of said swing piece; and,
        (3) an axially extended engaging block for selectively engaging said ratchet buckling blocks in locked manner.

2. The cable winding apparatus as recited in claim 1 wherein said elastic pieces of said swing piece are integrally formed with said main portion to extend from opposing parts thereof.

3. The cable winding apparatus as recited in claim 1 wherein said elastic pieces of said swing piece include metallic components secured to said main portion.

4. The cable winding apparatus as recited in claim 1 further comprising a supporting seat coaxially coupled to said first conductive disk, said first communication cable being wound about said supporting seat.

5. The cable winding apparatus as recited in claim 4 wherein said supporting seat has formed therein a radially extended line groove for receiving a portion of said first communication cable, said supporting seat including a positioning block coupled to extend over said line groove, said positioning block having formed therein a plurality of through holes for respectively receiving said conductive pieces therethrough, said through holes being unequally spaced from a center of said supporting seat.

6. The cable winding apparatus as recited in claim 5 wherein said first conductive disk includes an axially extended convex ring portion about a central through hole.

7. The cable winding apparatus as recited in claim 6 wherein said convex ring portion has formed peripherally thereon a buckling groove, said spiral spring engaging said buckling groove to wind about said convex ring portion.

8. The cable winding apparatus as recited in claim 6 wherein said second conductive disk is disposed coaxially within said convex ring portion of said first conductive disk, said conductive rings of said second conductive disk being concentrically disposed with unequal radii.

9. The cable winding apparatus as recited in claim 6 wherein each said conductive piece of said first conductive disk is elastic in configuration.

10. The cable winding apparatus as recited in claim 9 wherein each said conductive piece includes a concave end passing through said central through hole of said first conductive disk for capturing a rolling ball against one said conductive ring of said second conductive disk.

11. The cable winding apparatus as recited in claim 9 wherein each said conductive piece includes a convex end passing through said central through hole of said first conductive disk for engaging one said conductive ring of said second conductive disk.

12. The cable winding apparatus as recited in claim 1 further comprising a pad coupled to one of said first and second housing members, said pad having formed thereon a pair of spaced stoppers for supporting therebetween at least a portion of said spiral spring.

13. The cable winding apparatus as recited in claim 1 wherein said first housing member includes an inner lateral surface and an annular ring portion protruding therefrom for supporting at least a portion of said first conductive disk.

14. The cable winding apparatus as recited in claim 6 wherein said first conductive member has formed thereon a plurality of axially extending positioning and buckling holes, and said supporting seat includes a plurality of positioning blocks and hooks projecting therefrom to respectively engage said positioning and buckling holes.

15. The cable winding apparatus as recited in claim 6 wherein each said conductive piece of said first conductive disk includes a forked end engaging said first communication cable portion disposed in said line groove of said supporting seat, each said conductive piece having a positioning hole formed adjacent said forked end.

16. The cable winding apparatus as recited in claim 15 wherein said positioning block having formed about each said through hole thereof a positioning groove and a positioning post projecting therefrom, said positioning post engaging said positioning hole of one said conductive piece.

17. The cable winding apparatus as recited in claim 1 wherein each of said first and second communication cables is terminated by a plug.

* * * * *